United States Patent [19]
Tucker et al.

[11] Patent Number: 5,469,554
[45] Date of Patent: Nov. 21, 1995

[54] DETECTING THE PRESENCE OF A DEVICE ON A COMPUTER SYSTEM BUS BY ALTERING THE BUS TERMINATION

[75] Inventors: Brian B. Tucker, The Woodlands; Brian V. Belmont, Houston, both of Tex.

[73] Assignee: Compaq Computer Corp., Houston, Tex.

[21] Appl. No.: 259,636

[22] Filed: Jun. 14, 1994

[51] Int. Cl.[6] ............................................. G06F 11/20
[52] U.S. Cl. ................ 395/420; 365/183.01; 365/183.19
[58] Field of Search ................................ 395/325, 275, 395/425, 420, 183.06, 183.03, 183.19, 185.06, 728

[56] References Cited

U.S. PATENT DOCUMENTS

| | | |
|---|---|---|
| 4,999,805 | 3/1991 | Culley et al. |
| 5,101,492 | 3/1992 | Schultz et al. |
| 5,263,148 | 11/1993 | Jones, Jr. |

OTHER PUBLICATIONS

Plug and Play ISA Specification, Version 1.0, May 28, 1993.
EISA Specification, Version 3.1, Appendix 1 of U.S. Pat. No. 5,101,492.

*Primary Examiner*—Vincent P. Canney
*Attorney, Agent, or Firm*—Pravel, Hewitt, Kimball & Krieger

[57] ABSTRACT

A computer system determines the presence of a device on the system bus that responds to I/O or memory reads by performing an I/O or memory read with data bus pulled to its normally undriven state. If the value returned is other than the data bus' normally undriven value, it is determined that a device is responsive to that I/O or memory read. Otherwise, the system then pulls the data bus to other than its normally undriven state and performs another I/O or memory read. If the value returned is again the value of the data bus' normally undriven state, it is determined that a device is present because it is driving the data bus back to its normally undriven state. Otherwise, it is determined that a device is not driving the data bus in response to an I/O or memory read. Further, the computer system according to the invention makes the determination of whether a device is driving the bus using a comparator to compare the level present on the data bus in response to the I/O or memory reads.

11 Claims, 3 Drawing Sheets

DETECTING THE PRESENCE OF A DEVICE ON A COMPUTER SYSTEM BUS BY ALTERING THE BUS TERMINATION

RELATED CASES

This application is related to co-pending Ser. No. 08/145,400, filed Oct. 29, 1993, entitled "Method of and Apparatus for Disabling Individual Slots on a Computer BUS," to co-pending Ser. No 08/145,339, filed Oct. 29, 1993, entitled "Detecting the Presence of a Device on a Computer System Bus by measuring the Response Time of Data Signals on the Bus, and Maximizing System Performance Based on that Response Time," and to co-pending Ser. No. 08/145,338, filed Oct. 29, 1993, entitled "Method of Determining the Configuration of Devices Installed on a Computer Bus," all of which have been assigned to the assignee of this application.

BACKGROUND OF THE INVENTION

1. Field of the Invention

The invention relates to computer busing systems, and more particularly to a method of and apparatus for detecting whether a device responds to a particular I/O address read asserted on that bus.

2. Description of the Related Art

The microcomputer industry has experienced tremendous growth over the last twenty years. From the days of its infancy when only a few interested "hackers" could fathom its quirks and nuances, the microcomputer has now evolved into a powerful business and personal tool found on virtually every office desk and in virtually every home.

The microcomputer's road to success has not been without its problems, however. While advances occur at an astounding pace, those advances must accommodate the standards found in the then existing base of microcomputer systems. This is known as upwards compatibility. To maintain such compatibility, the industry has seen one microcomputer standard laid on top of another, with a resulting hodgepodge of standards-within-standards that designers must maintain to allow existing users to upgrade their equipment. These multiple standards gradually shed their oldest layers, replacing them with new layers reflecting the state-of-the-art. In this way, only the very oldest microcomputer systems become obsolete.

One early idea to enhance microcomputer systems was the addition of hardware enhancing expansion cards. These boards were generally plugged into a system bus to provide added functionality, such as telecommunications, disk storage, and improved video. These boards obviously had to conform to some standard. With the introduction of the IBM PC by International Business Machines Corp., and the later introduction of the PC/AT by IBM, the AT system bus soon became a de facto standard known as the Industry Standard Architecture bus, or the ISA bus. The AT bus accommodated both the 8-bit boards of the PC and newer 16-bit boards developed for the AT. Third-party manufacturers could economically design standard boards compatible with the wide variety of IBM PC and AT compatible microcomputer systems.

Further advances in microprocessor technology, however, pushed the ISA bus to its limits. For this reason, another "layer" was added to the ISA bus standard. This added layer became known as the Extended Industry Standard Architecture bus, or the EISA bus. Boards designed for the EISA bus had more pins, providing a wider data path for information to flow through the microcomputer system bus, analogous to adding lanes to a highway. The EISA bus also added more address lines to the standard, permitting more memory locations to be individually specified, much as would adding more digits to a phone number or a zip code.

One limitation of the ISA bus involved its method of handling I/O addressing. An address enable signal (AEN) was driven low by an ISA bus master to indicate to all of the boards that the currently asserted address was an I/O address rather than a memory address. But because AEN was asserted low to all boards, each board had to be physically configured to respond to a different range of I/O and memory addresses to avoid conflicts. This address differentiation was usually accomplished when installing the boards by setting microswitches on dual in-line packages (DIP) or by connecting jumpers on each board. Improperly setting these switches could result in conflicts on a read or write to a particular I/O address and could even result in physical hardware damage.

While the ISA standard provided 16 bits of I/O addressing, in developing boards for PC-compatible computers, vendors often only used or decoded the lower 10 bits. Thus, to be fully compatible with the available boards, the I/O address space of the ISA bus effectively was only from 0 to 03 FFh. Thus, a large portion of the I/O space was unusable.

The EISA bus standard has resolved this problem to some extent. The EISA bus definition provides for a conflict-free I/O address space for each slot. This is fully described in U.S. Pat. No. 4,999,805 and the EISA Specification, Version 3.1, which is Appendix 1 of U.S. Pat. No. 5,101,492, both of which are hereby incorporated by reference. The expansion board manufacturers include a configuration file with each EISA expansion board, and optionally, with switch programmable ISA products. A configuration utility program provided by the system manufacturer uses the information contained in the configuration files to determine a conflict-free configuration of the system resources. The configuration utility stores the configuration and initialization information into non-volatile memory and saves a backup copy on diskette. Details of this configuration process are provided in U.S. Pat. No. 5,263,148, issued Nov. 16, 1993, entitled "Method and Apparatus for Configuration of Computer System and Circuit Boards," which is hereby incorporated by reference. The system ROM power up routines use the initialization information to initialize the system during power up, and device drivers use the configuration information to configure the expansion boards during operation.

However, this slot specific addressing does not help with ISA boards. Slot specific ISA board disabling can prevent such physical conflicts between two boards during their initialization. Briefly, a mask register is provided to mask off the AEN signal to selected slots. Details are provided in Ser. No. 08/145,400, filed Oct. 29, 1993, entitled "Method of and Apparatus for Disabling Individual Slots on a Computer Bus," which is hereby incorporated by reference. The startup routines individually enable each ISA slot using a slot specific mask register. The startup routines then must determine what address spaces that board occupies. With the address space identified, this results in a signature and allows a determination of the particular board, to allow conflict checking and user setup. This is described in Ser. No. 08/145,338, filed Oct. 29, 1993, entitled "Method of Determining the Configuration of Devices Installed on a Computer Bus," which is hereby incorporated by reference.

Once the startup routines enable a single ISA board, however, determining what addresses that board responds to is not trivial. Unlike EISA boards, ISA boards do not provide an identification register. Thus, the occupied address space of an ISA board must be determined in some other way.

In a typical system, a number of ISA boards may be installed, and the system software must then determine not only whether an ISA board is present in a particular slot, but also what type of board is installed in that slot. This involves determining what I/O or memory read addresses a particular board occupies. First, using the slot specific disabling described in Ser. No. 08/145,400, a single slot on the ISA or EISA system bus is enabled. Then, all of the I/O and memory addresses are read. Each address that returns a value different from what an undriven data bus would return indicates that the enabled board has driven the data bus in response to a read from that particular I/O address. To simplify this determination, the data bus is pulled up by resistors so that a read from a particular address returns 0FFh if the bus is not driven.

But just because a read results in 0 FFh does not necessarily mean the bus is undriven. The particular board installed in the enabled slot may actually be driving an 0 FFh on the data lines at that address in response to the read. Using standard systems, there is no way to determine this difference. Thus, a read value of 0 FFh remains ambiguous and only non-0 FFh locations are positively known. This will often leave a very large number of ambiguous locations, rendering identification of the board more difficult.

It would be desirable to determine each I/O and memroy read address at which a particular board or device responds by driving the data bus, whether driving with the undriven value of the data bus or otherwise.

SUMMARY OF THE INVENTION

It is simple to detect when an ISA board drives values onto the data bus different from the bus' undriven state—the I/O or memory read returns a value other than the undriven data bus value 0 FFh on a pulled-up data bus, and 00 h on a pulled-down data bus. The apparatus and method according to the invention, however, go further. If a particular I/O or memory read returns a data bus value of 0 FFh, or whatever the undriven data bus value is, the apparatus and method according to the invention then performs a read cycle with the data bus pulled to its normally driven state.

If a read from the address under test still returns the normally undriven value, that indicates the slot under test contains a card that responds to the address under test.

Further, the apparatus and method according to the invention monitors the state of the data bus with at least one comparator. This comparator permits detection of a card's response even when the level driven onto the data bus is not sufficient to drive standard logic devices to a particular state.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

Figure 1:
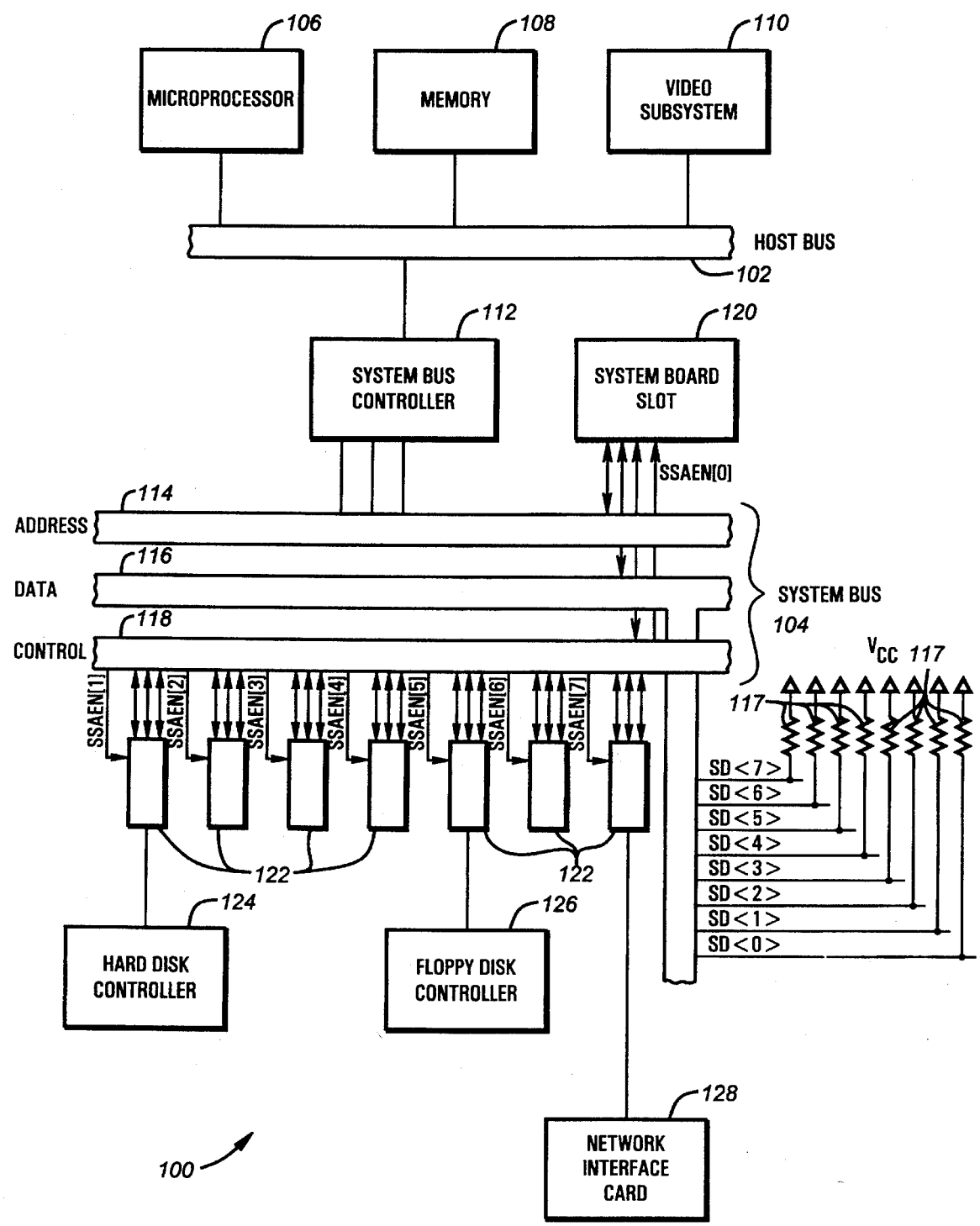
FIG. 1 is a block diagram of a computer system incorporating the method and apparatus according to the invention.

Turning now to the drawings, FIG. 1 is a block diagram of a microcomputer system 100 in which the method and apparatus according to the invention is implemented. The microcomputer system 100 includes a host bus 102 and a system bus 104. A microprocessor 106, memory 108, and a video subsystem 110 internally communicate at high speed with each other over the host bus 102. The host bus 102 is designed for speed rather than expansion, so the host bus 102 has little, if any, provision for expansion boards.

A system bus controller 112 provides an interface between the host bus 102 and system bus 104. The system bus controller 112 is located on the system board of the microcomputer system 100. The system bus controller 112 is preferably implemented using an application specific integrated circuit (ASIC) but could be implemented using discrete components.

The system bus 104 is typically an EISA bus, but could be another bus using similar addressing protocols. The system bus controller 112 implements the functions of an EISA bus controller. It is also within the system bus controller 112 that the data bus response time circuitry according to the invention is preferably implemented.

The system bus 104 consists of address lines 114, data lines 116, and control lines 118. Connected to the system bus 104 is a system board slot 120. The system board slot 120 is not a separate physical connection, but instead logically connects "devices" integrated into the system board of the microcomputer system 100 itself to the system bus 104. Further connected to the system bus 104 are slots 122. The slots 122 are physical connectors for inserting expansion cards compatible with the standard of the system bus 104 to provide the added functionality to the microcomputer system 100. Shown inserted in the first, fifth, and seventh of the slots 122 are respectively a hard disk controller 124, a floppy disk controller 126, and a network interface card 128.

The lower byte of the data lines 116, denoted as SD<7 . . . 0>, are pulled up by pull-up resistors 117. These pull-up resistors 117 ensure that the undriven data lines 116 return a value of 0 FFh. The EISA standard specifies that these pull-up resistors 117 should be 8.2 k ohm.

Each device connected to the system bus 104, whether a device plugged into one of the slots 122 or a system board device corresponding to the system board slot 120, includes an individual slot specific address enable line SSAEN[Z], where Z equals 0 to 7. These signals correspond to the AENx signals of the EISA specification or AEN signal for ISA systems, but further implementing slot specific disabling, as is described in Ser. No. 08/145,400, as referenced above.

Figure 2:
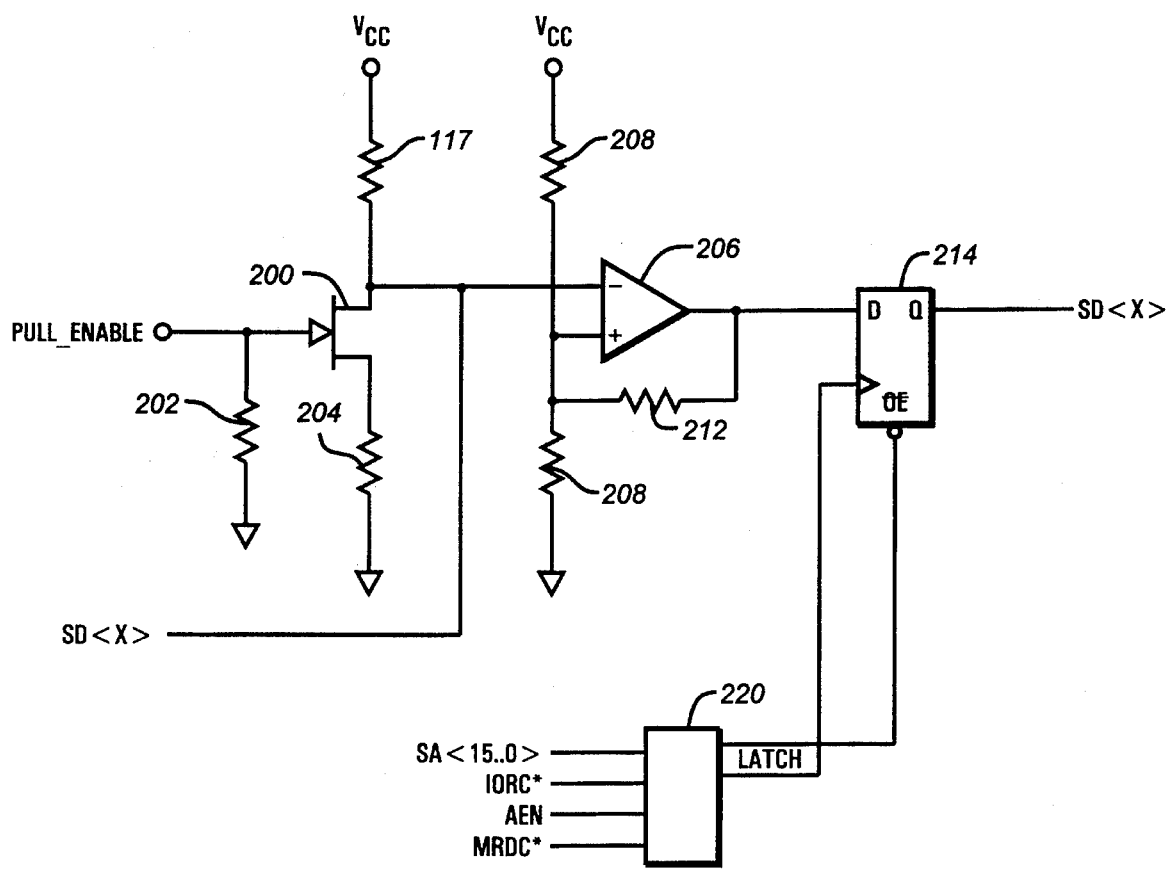
FIG. 2 is a schematic illustration of circuitry used to implement the data bus pull-down according to the invention.

FIG. 2 is a schematic of circuitry used to implement the data bus pull-down according to the invention. This circuitry is preferably implemented as part of the system bus controller 112. Preferably, corresponding circuitry is provided for each of the data lines 116, but the invention can be implemented using only one of the data lines 116, such as SD<0>.

In the following description, active low signals are denoted by an asterisk subscript. These signals are true when low and false when high. The logical counterparts of these signals (i.e., true when high, false when low) are denoted by omitting the asterisk. Further, the logical negation operator is denoted by a prefixed exclamation point, logical ANDing is denoted by a bullet, and logical ORing is denoted by a plus sign.

A pull-down enable signal PULL_ENABLE is provided to the gate of a FET switch 200. PULL_ENABLE is also pulled down by a resistor 202, which is of an arbitrary value sufficient to turn off the FET switch 200. PULL_ENABLE is provided as a bit of an input/output (I/O) register through I/O circuitry not shown. When it is desired to pull down the data lines 116 according to the invention, the microprocessor 106 writes to an arbitrary I/O port an appropriate data value containing a bit corresponding to PULL_ENABLE.

In a system other than an EISA system, the pull-up resistors 117 might instead be pull-down resistors. In such a case, the value returned by an I/O or memory read of an undriven data bus then defaults to 00h instead of 0 FFh. The circuitry and program flow described in conjunction with all of the Figures could of course be adapted for such a system, pulling the data lines up instead of down then monitoring for the board under test pulling the data lines down rather than up.

The drain of the FET switch 200 is connected to one of the data lines 116 SD<x>. SD<x> is also pulled up by the pull-up resistor 117, preferably 8.2 k ohm as defined in the EISA specification. The source of the FET switch 200 is connected to ground through a pull-down resistor 204, preferably 2 k ohm. The pull-up resistor 117 normally pulls SD<x> to VCC, which is preferably 5 V. When PULL_ENABLE is true, however, the FET switch 200 is on, thus pulling down SD<x> through the pull-down resistor 204.

SD<x> is further provided to the negative input of a comparator 206. The positive input of the comparator 206 is connected to the center tap of two divider resistors 208 and 210, which are preferably each 8.2 k ohm. The divider resistor 208 is also connected to VCC, and the divider resistor 210 is connected to ground. Thus, without feedback, the positive input of the comparator 206 is approximately VCC/2. To prevent oscillation, a positive feedback resistor 212 provides positive feedback from the output of the comparator 206 to its positive input, thus providing a slight amount of hysteresis. The value of the positive feedback resistor 212 is arbitrary, but could be, for example, 100 k ohm.

The output of the comparator 206 is provided to the D input of a D flip-flop 214. The Q output of the flip-flop 214 drives SD<x> when the flip-flop 214 is enabled through its output enable OE, by circuitry described below.

A LATCH output signal of a PAL 220 clocks the flip-flop 214. The inputs to the PAL 220 are standard ISA address signals SA<15 . . . 0>, a standard ISA I/O read signal IORC*, a standard ISA memory read signal MRDC*, and a standard ISA system board address enable signal AEN, which is the ANDed value of all of the standard EISA slot specific address enable signals AENx. The internal logic of the PAL 220 causes LATCH to rise, thus clocking the flip-flop 214, on the trailing edge of either an I/O read from any port other than a port address P_COMPRD or of a memory read. This is accomplished through the following equation programmed into the PAL 220:

$$\text{LATCH} = (\text{MRDC*} \cdot (\text{IORC*} + \text{AEN} + (\text{SA} <15 \ldots 0> == \text{P\_COMPRD}))$$

In this equation, P_COMPRD is the address assigned for reading the state of the comparator 206. That state should not be latched into the flip-flop 214 when reading from I/O address P_COMPRD because a read from that I/O port should instead read the value latched into the flip-flop 214, as is discussed below. This equation causes the output of the comparator 206 to be latched into the flip-flop 214 on any other I/O read or on any memory read.

The flip-flop 214 is enabled by its output enable signal input OE*, which is provided by an output of the PAL 220. Internal logic of the PAL 220 causes the output to the OE, input of the flip-flop 214 to be driven low, or active, on an I/O or memory read from P_COMPRD. The equation is:

$$\text{OE*} = (\text{IORC*} + \text{AEN} + !(\text{SA}<15 \ldots 0> == \text{P\_COMPRD}))$$

On such a read, the flip-flop 214 drives the value previously latched from the comparator 206 on the last memory read or the last I/O read from a port other than P_COMPRD onto SD<x>. In this way, the microprocessor 106 can determine the output of the comparator 206.

If an expansion card in an enabled slot 122 is not driving SD<x> in response to an I/O or memory read, then when PULL_ENABLE is true, the pull-down resistor 204 pulls SD<x> down to a value somewhat less than the value present on the positive input of the comparator 206. Thus, the comparator output becomes logical low, which the flip-flop 214 then latches on an I/O or memory read from the address under test. A subsequent read from P_COMPRD then returns that low value.

If, however, an expansion board in the slot 122 under test is driving SD<x> on such an I/O or memory read, even when PULL_ENABLE is true the negating input of the comparator 206 becomes slightly higher then its positive input. Then, the flip-flop 214 latches a logical high value, which is driven onto SD<x> on the next read of P_COMPRD. In this way, it is determined whether an expansion board in one of the slots 122 is driving the data bus in response to an I/O or memory read.

Figure 3:
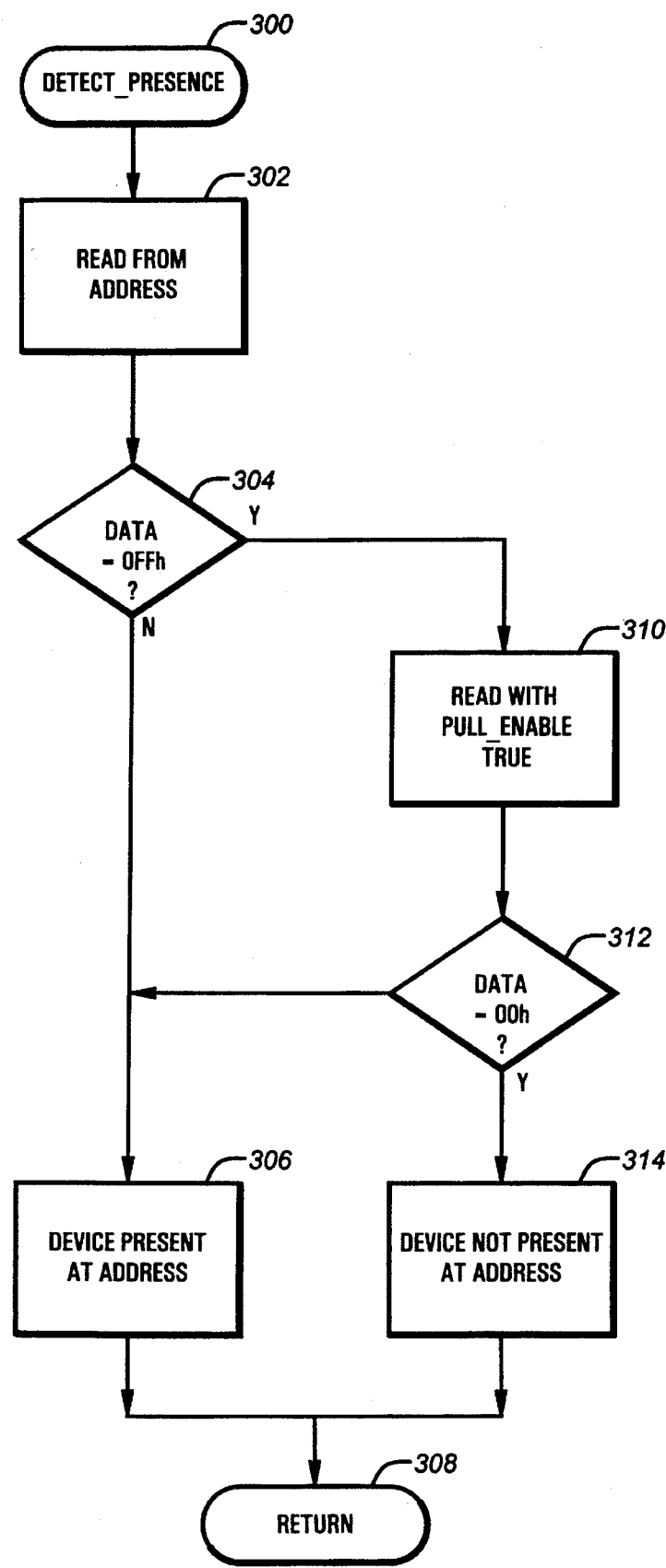
FIG. 3 is a flowchart of software that uses the circuitry at FIG. 2.

FIG. 3 is flowchart of a routine DETECT_PRESENCE 300, which is used to detect the presence of an expansion board in a slot 122 under test. In this routine, it is presumed that all of SD<7 . . . 0> include circuitry as shown in FIG. 2.

Starting at step 302, the routine DETECT_PRESENCE 300 performs an I/O or memory read from the address under test with PULL_ENABLE low, preventing the pull-down resistor 204 from pulling down SD<x>.

Proceeding to step 304, the value returned on that I/O or memory read is compared to 0 FFh, the normally pulled up value of the data lines 116. If the response was other than that value, then an expansion board is driving the data lines 116 in response to an I/O or memory read from the address under test, so the routine proceeds to step 306, where it sets a flag indicating an expansion board is present at the address under test and then proceeds to step 308, where it returns.

If at step 304 the data value returned was equal to 0 FFh, this corresponds to the value on the data lines 116 when undriven, so the address must be further tested. The routine DETECT_PRESENCE 300 then proceeds to step 310, where it performs a read with PULL_ENABLE set to true. The microprocessor 106 first writes to an arbitrary address to set PULL_ENABLE, and then the microprocessor performs an I/O or memory read from the address under test that initially returned 0 FFh. After this read, the microprocessor 106 then reads from I/O address P_COMPRD, retrieving the data value returned on the previous I/O or memory read as latched from the comparator 206.

The routine then proceeds to step 312, where it compares the data value read from P_COMPRD to 00 h. Assuming all of the data lines 116 include the pull-down circuitry shown in FIG. 2, if an expansion board is not driving the data lines 116, that read will have returned a value of 00 h. So the value read from P_COMPRD is compared to 00 h at step 312, and if not 00 h, it is determined that the device is present at the address under test, as it must be driving the data lines 116 high even with the data lines pulled down. If the data value returned is equal to 00 h at step 312, then the routine proceeds to step 314, where it sets a flag indicating a device is not present at the address under test, and then proceeds to step 308 where it returns with that flagged value.

It will be appreciated that the comparison at step 312 would be slightly different if less than the full number of data lines 116 have the pull-down circuit of FIG. 2 implemented. In such a case, only the data lines 116 incorporating that circuitry would be tested, and the other data lines 116 would be masked out before making the comparison to 00 h.

As can be appreciated, a number of modifications to the circuitry and the method of the invention will still embody the basic concept of changing the undriven state of the data lines 116 to determine whether a device is actually responding to an I/O or memory read. Although the disclosed embodiment focused on reads from I/O addresses, the same procedure could be used for reading from memory addresses. Further, although the comparator 206 provides greater accuracy in determining the presence of expansion boards, the invention can also be implemented by switching the FET switch 200 and determining if that does not change the value returned on an I/O or memory read itself from the device under test. If not, that indicates an expansion board is responding to a read from the address under test. The system bus 104 can also be an ISA bus, with appropriate modifications to the circuitry of FIG. 2. All of these various ways of implementing the invention will be understandable by one knowledgeable in computer bus designs.

The foregoing disclosure and description of the invention are illustrative and explanatory, and various changes in the size, shape, materials, components, circuit elements, wiring connections and contacts, as well as in the details of the illustrated circuitry and construction and method of operation may be made without departing from the spirit of the invention.

We claim:

1. A method of determining if a device is driving the data lines on a bus in response to a read operation in a system with a processor for initiating read operations and with a bus with address lines, control lines, and data lines, at least one of the data lines normally occupying a default state when undriven, a read of the one of the data lines while in the default state returning a default value in response, comprising the steps of:

(1) performing a first read operation, saving a first read value from the one of the data lines;

(2) determining that a device is driving the one of the data lines in response to said first read operation if said first read value is different from the default value;

(3) if at step (2) the read value was equal to the default value, pulling the one of the data lines to a state other than the default state;

(4) performing a second read operation, saving a second read value from the one of the data lines;

(5) determining that a device is driving the one of the data lines in response to said second read operation if said second read value equals the default value; and (6) determining that a device is not driving the one of the data lines in response to either said first read operation or said second read operation if said second read value is different from the default value and said first read value is equal to the default value.

2. The method of claim 1, wherein the default value is logical one.

3. The method of claim 1, wherein said saving said second read value includes the step of retrieving said second read value from a comparator.

4. An apparatus for determining whether a device is responding to a read operation in a computer system with a system bus with address lines, control lines, and data lines, and with a microprocessor for initiating the read operations, the apparatus comprising:

means for forcing at least one of the data lines when undriven to a first predetermined state during a first read operation;

means for forcing said one of the data lines when undriven to a second predetermined state during a second read operation;

means for determining whether said one of the data lines is in a first state or a second state; and means for determining whether an expansion board is responsive to a read operation, said means responsive to said means for determining whether said one of the data lines is in a first state or a second state, determining that an expansion board is installed if said one of the data lines is in said first predetermined state during said first read operation and is in said second predetermined state during said second read operation.

5. The apparatus of claim 4, wherein said means for determining whether said one of the data lines is in a first state or a second state includes a comparator.

6. The apparatus of claim 4, wherein said means for determining whether said one of the data lines is in a first state or a second state includes a means for executing a read operation by the microprocessor.

7. The apparatus of claim 4, wherein said means for forcing said one of the data lines when undriven to a first predetermined state during a first read operation, said means for forcing said one of the data lines when undriven to a second predetermined state during a second read operation, said means for determining whether said one of the data lines is in a first state or a second state, and said means for determining whether an expansion board is responsive to a read operation are repeated for each of a plurality of the data lines.

8. A computer system for detecting presence of devices at certain addresses, comprising:

a system bus including address, data, and control lines;

a microprocessor for executing a read operation coupled to said system bus; and means for determining if a device is responsive to a read operation on the system bus from an address, including means for forcing at least one of the data lines when undriven to a first predetermined state during a first read operation;

means for forcing said one of the data lines when undriven to a second predetermined state during a second read operation;

means for determining whether said one of the data lines is in a first state or a second state; and means for determining whether an expansion board is responsive to a read operation, said means responsive to said means for determining whether said one of the data lines is in a first state or a second state, determining that an expansion board is installed if said one of the data lines is in said first predetermined state during said first read operation and is in said second predetermined state during said second read operation.

9. The apparatus of claim 8, wherein said means for forcing one of the data lines when undriven to a first predetermined state during a first read operation, said means for forcing said one of the data lines when undriven to a second predetermined state during a second read operation, said means for determining whether said one of the data lines is in a first state or a second state, and said means for determining whether an expansion board is responsive to a read operation are repeated for each of a plurality of the data lines.

10. The system of claim 8, wherein said system bus is an ISA bus.

11. The system of claim 8, wherein said system bus is an EISA bus.

* * * * *